(12) United States Patent
Khekht

(10) Patent No.: US 6,986,655 B2
(45) Date of Patent: Jan. 17, 2006

(54) DOUGH DIVIDING APPARATUS

(76) Inventor: Rafail Khekht, 1086 Ocean Ave. #A-7, Brooklyn, NY (US) 11230

( * ) Notice: Subject to any disclaimer, the term of this patent is extended or adjusted under 35 U.S.C. 154(b) by 84 days.

(21) Appl. No.: 10/242,945

(22) Filed: Sep. 16, 2002

(65) Prior Publication Data

US 2004/0052888 A1 Mar. 18, 2004

(51) Int. Cl.
A21C 5/00 (2006.01)

(52) U.S. Cl. .......... 425/239; 425/260; 425/98; 425/103; 426/503; 426/518

(58) Field of Classification Search ........ 425/239, 425/238, 256, 260, 96, 98, 102, 103; 426/503, 426/518
See application file for complete search history.

(56) References Cited

U.S. PATENT DOCUMENTS

| 871,650 | A | * | 11/1907 | Streich | 425/239 |
| 1,763,345 | A | * | 6/1930 | Devlin | 425/238 |
| 2,270,512 | A | * | 1/1942 | Devlin | 425/238 |
| 3,485,187 | A | * | 12/1969 | Benier | 425/238 |
| 4,742,941 | A | * | 5/1988 | Tastet | 425/238 |
| 4,792,298 | A | * | 12/1988 | Tastet | 425/239 |
| 6,345,971 | B1 | * | 2/2002 | Buurma | 425/238 |

FOREIGN PATENT DOCUMENTS

WO  WO 93/17560  * 9/1993

* cited by examiner

Primary Examiner—Robert Davis
Assistant Examiner—Thu Khanh T. Nguyen

(57) ABSTRACT

A dough dividing apparatus for dividing dough into substantially equal portions. The dough dividing apparatus includes a bin portion for receiving dough in an interior space of the bin portion. A cylinder is coupled to the bin portion whereby a lumen of the cylinder is in fluid communication with the interior space of the bin portion. A piston assembly is slidably positioned in the lumen of the cylinder. The piston assembly is for drawing dough into the cylinder and extruding dough from the cylinder when the piston assembly is slid in the cylinder. A dividing assembly is coupled to the cylinder for receiving and dividing dough extruded from the cylinder. A driving assembly is operationally coupled to the piston assembly and the dividing assembly for actuating the piston assembly and the dividing assembly.

5 Claims, 13 Drawing Sheets

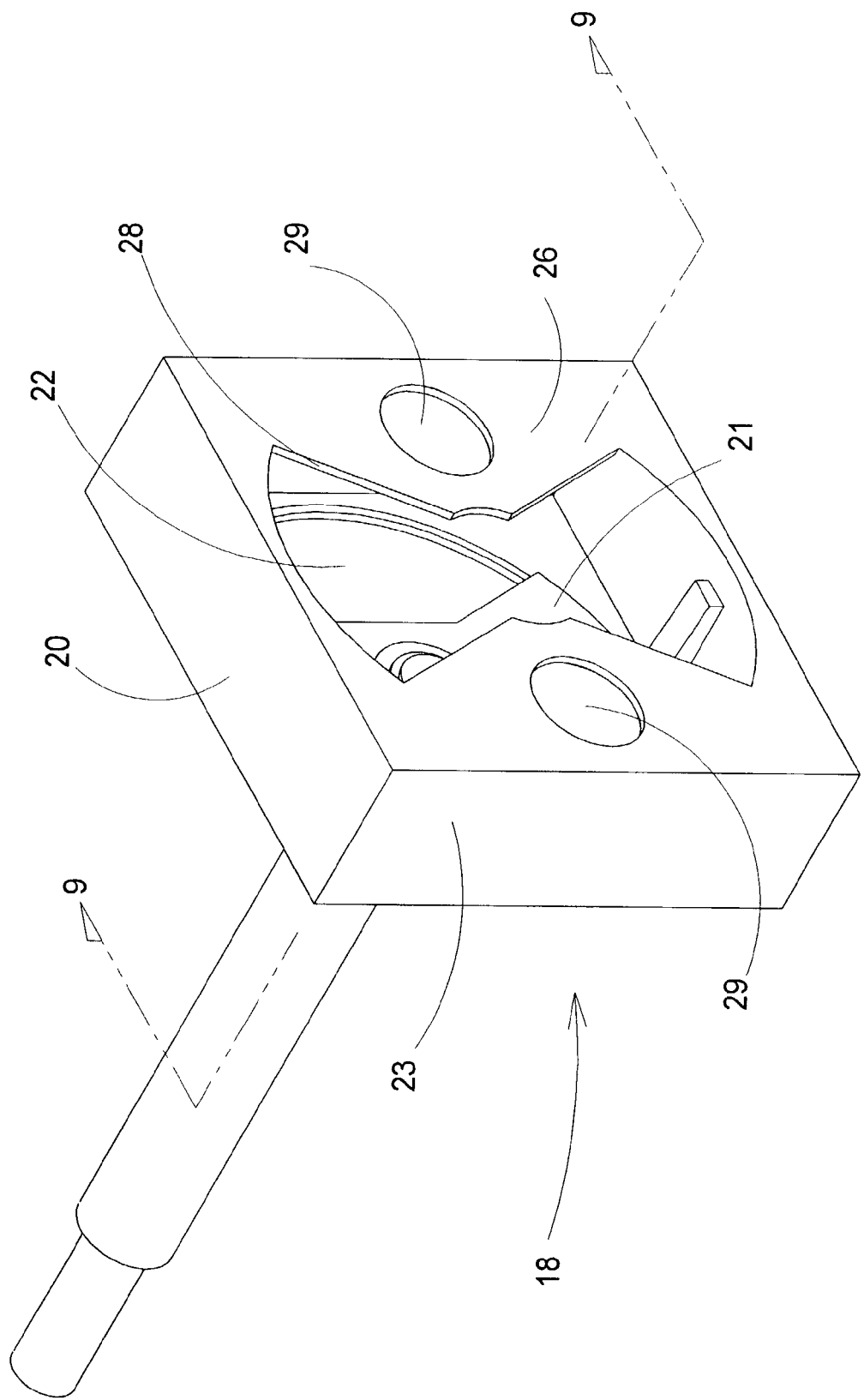

DOUGH DIVIDING APPARATUS

RELATED DATA

The subject matter of the present utility patent application has been awarded a "Authors Certificate" with the Union of Soviet Socialist Republics on Jul. 1, 1988 with a certification number of 1433449.

BACKGROUND OF THE INVENTION

1. Field of the Invention

The present invention relates to dough dividers and more particularly pertains to a new dough dividing apparatus for dividing dough into substantially equal portions.

2. Description of the Prior Art

The use of dough dividers is known in the prior art. U.S. Pat. No. 2,232,653 describes a device for dividing dough into predetermined quantities. Another type of dough divider is U.S. Pat. No. 1,981,151 having an actuation system for actuating the piston of a dough divider. U.S. Pat. No. 5,211,968 has a machine for delivering dough under pressure to a dividing chambers for dividing the dough into predetermined quantities. U.S. Pat. No. 4,616,990 has a one or more separate pistons selectively and operably arranged in a single piston-housing to effect separating of dough into predetermined portions.

While these devices fulfill their respective, particular objectives and requirements, the need remains for a device that has certain improved features that do not require oil to lubricate the piston assembly within the lumen of the cylinder.

SUMMARY OF THE INVENTION

The present invention meets the needs presented above by providing spacing between the piston assembly and the cylinder to allow a portion of the dough to be positioned between the piston assembly and the cylinder whereby the dough acts as the lubricant for the piston assembly within the lumen of the cylinder.

Still yet another object of the present invention is to provide a new dough dividing apparatus that provides separation of dough into accurate portions.

Even still another object of the present invention is to provide a new dough dividing apparatus that allows adjustability of the size of the portions of the dough without need for complete disassembly.

To this end, the present invention generally comprises a bin portion comprising a perimeter wall. The perimeter wall defines an interior space of the bin portion. The interior space of the bin portion has an open upper end. The open upper end of the interior space is designed for permitting dough to be placed in the interior space of the bin portion. A cylinder is coupled to the bin portion opposite the open top end of the interior space of the bin portion. A lumen of the cylinder is in fluid communication with the interior space of the bin portion. A piston assembly is slidably positioned in the lumen of the cylinder. The piston assembly is for drawing dough into the cylinder and extruding dough from the cylinder when the piston assembly is slid in the cylinder. A dividing assembly is coupled to the cylinder whereby the dividing assembly is in fluid communication with the lumen of the cylinder. The dividing assembly is designed for receiving dough extruded from the cylinder by the piston assembly. The dividing assembly is designed for dividing the dough extruded from the cylinder. A driving assembly is operationally coupled to the piston assembly and the dividing assembly. The driving assembly is for actuating the piston assembly whereby the piston assembly slides in the lumen of the cylinder. The driving assembly is for actuating the dividing assembly whereby the dividing assembly is designed for dividing the dough extruded from the cylinder.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 13 is a perspective view of an alternate embodiment of the piston assembly of the present invention.

DESCRIPTION OF THE PREFERRED EMBODIMENT

Figure 1:
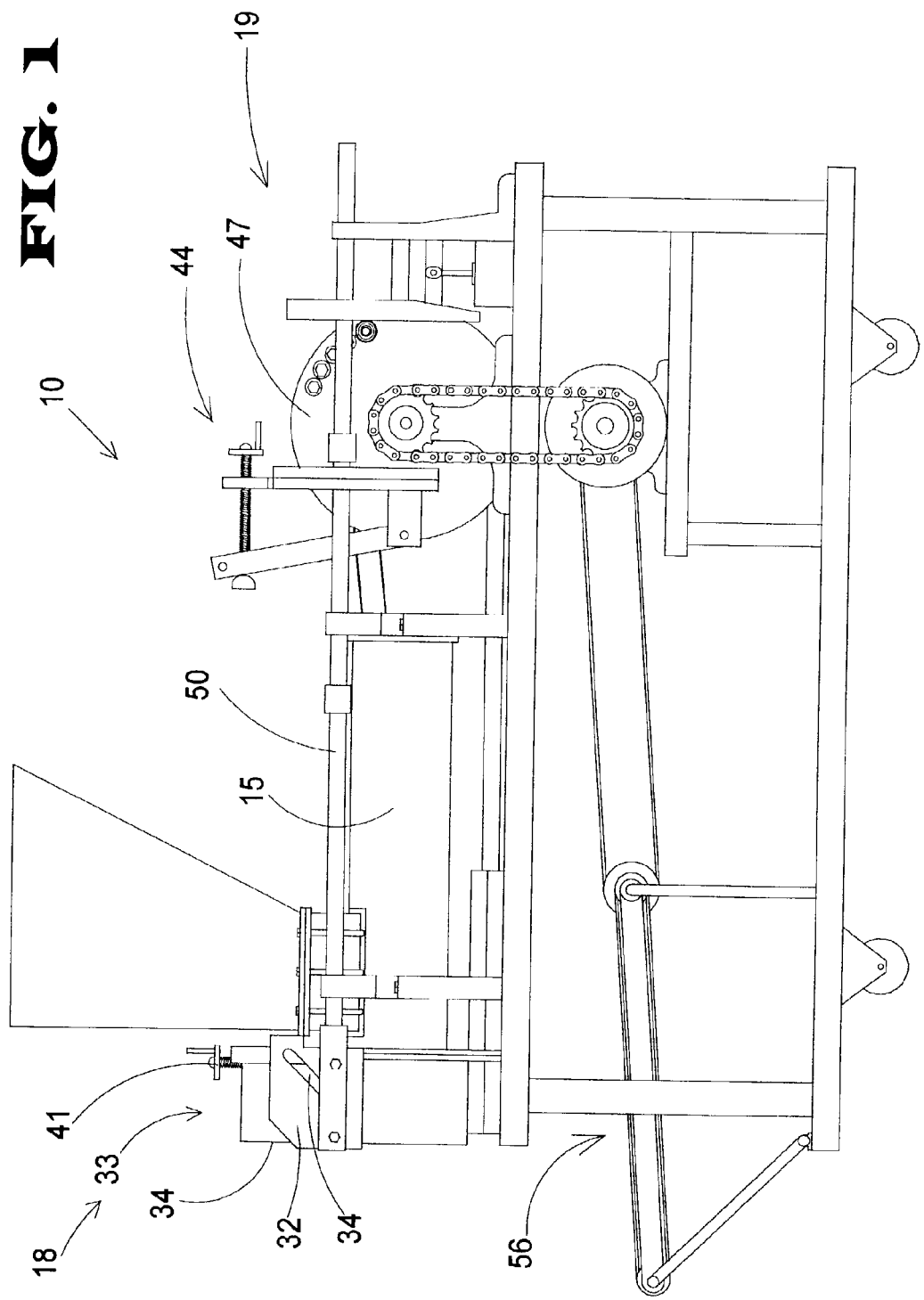
FIG. 1 is a side view of a new dough dividing apparatus according to the present invention.
Figure 2:
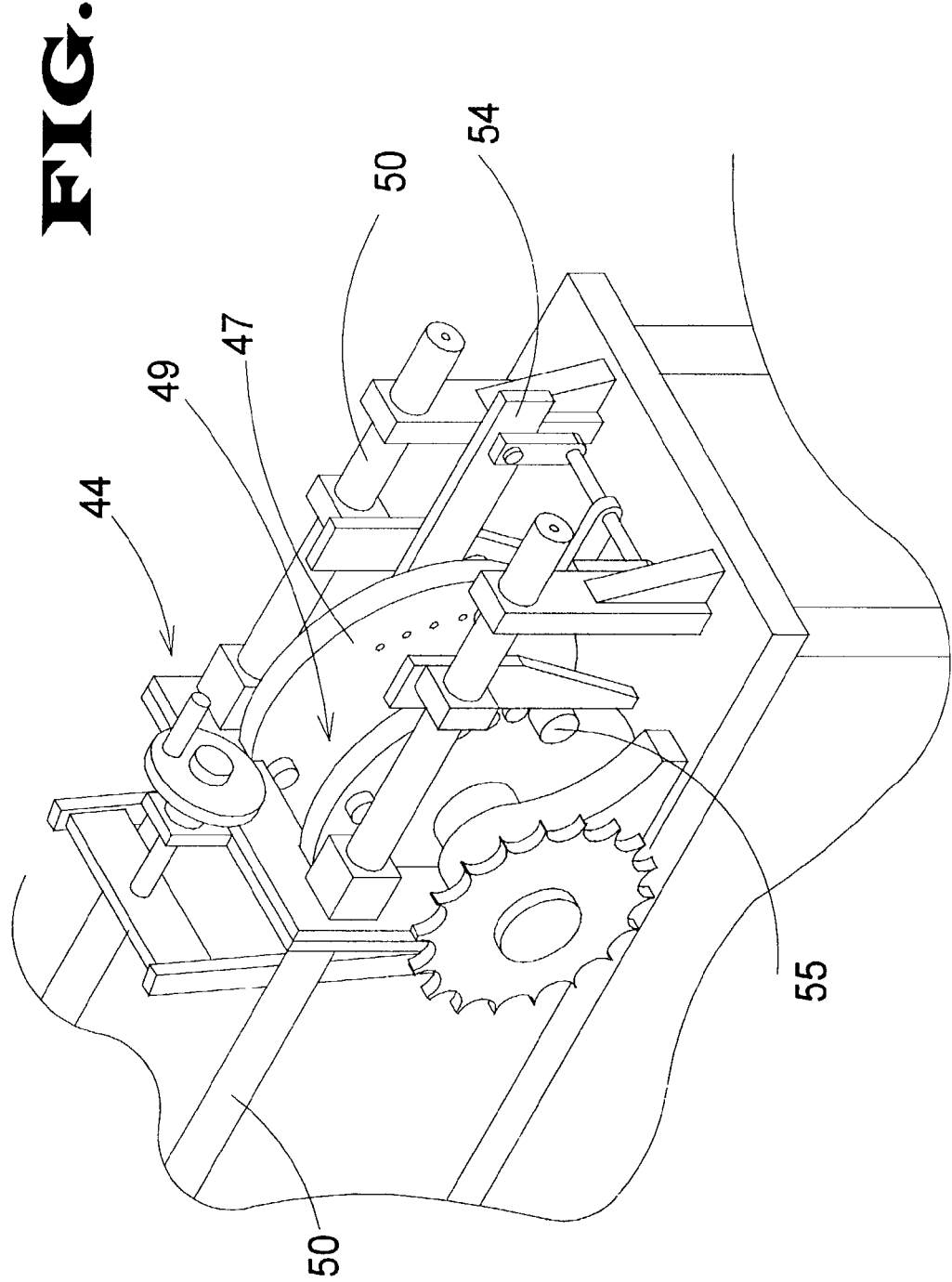
FIG. 2 is a perspective view of the drive assembly the present invention.
Figure 3:
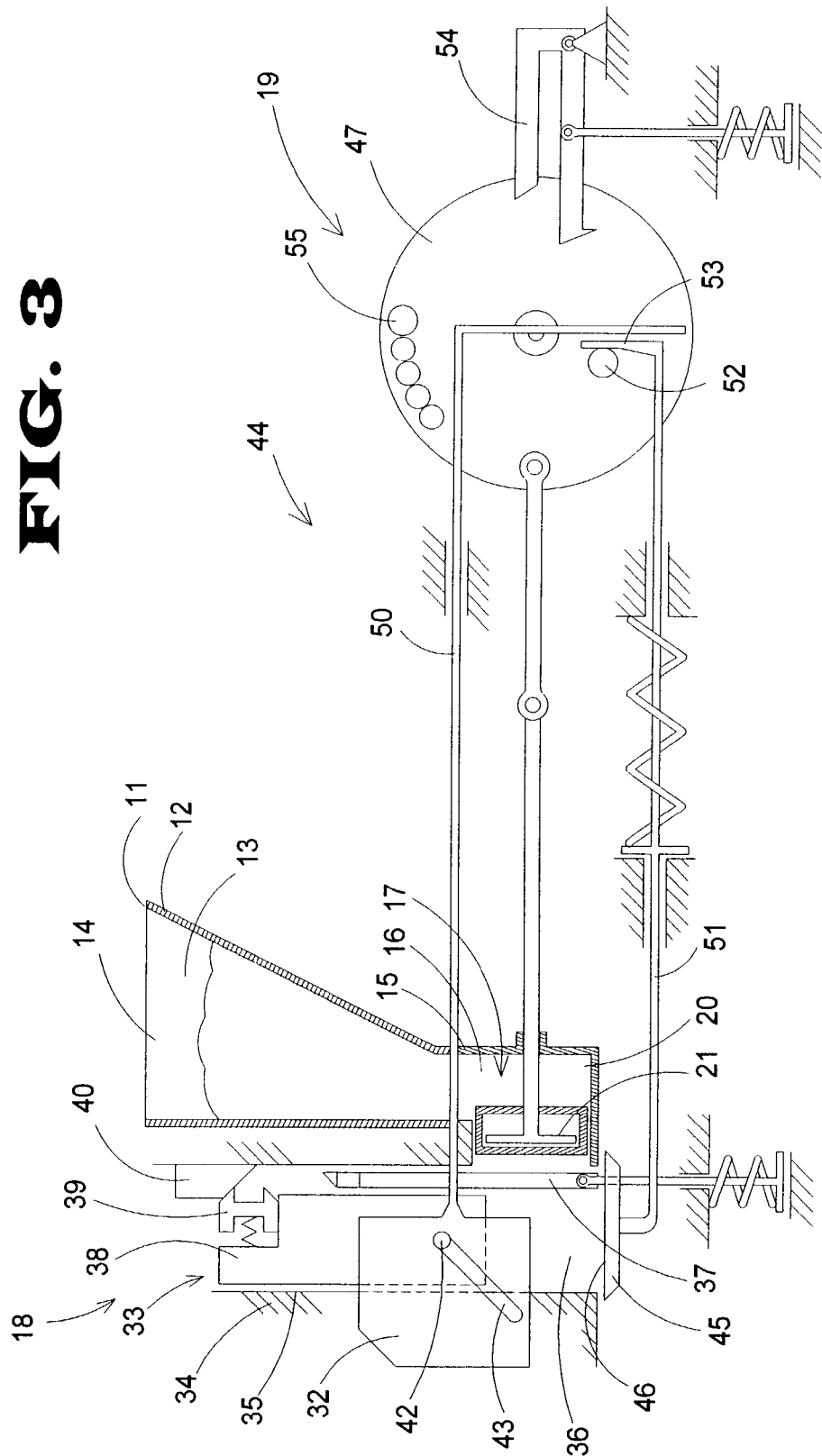
FIG. 3 is a schematic view of step 1 in the cycle of the present invention.
Figure 4:
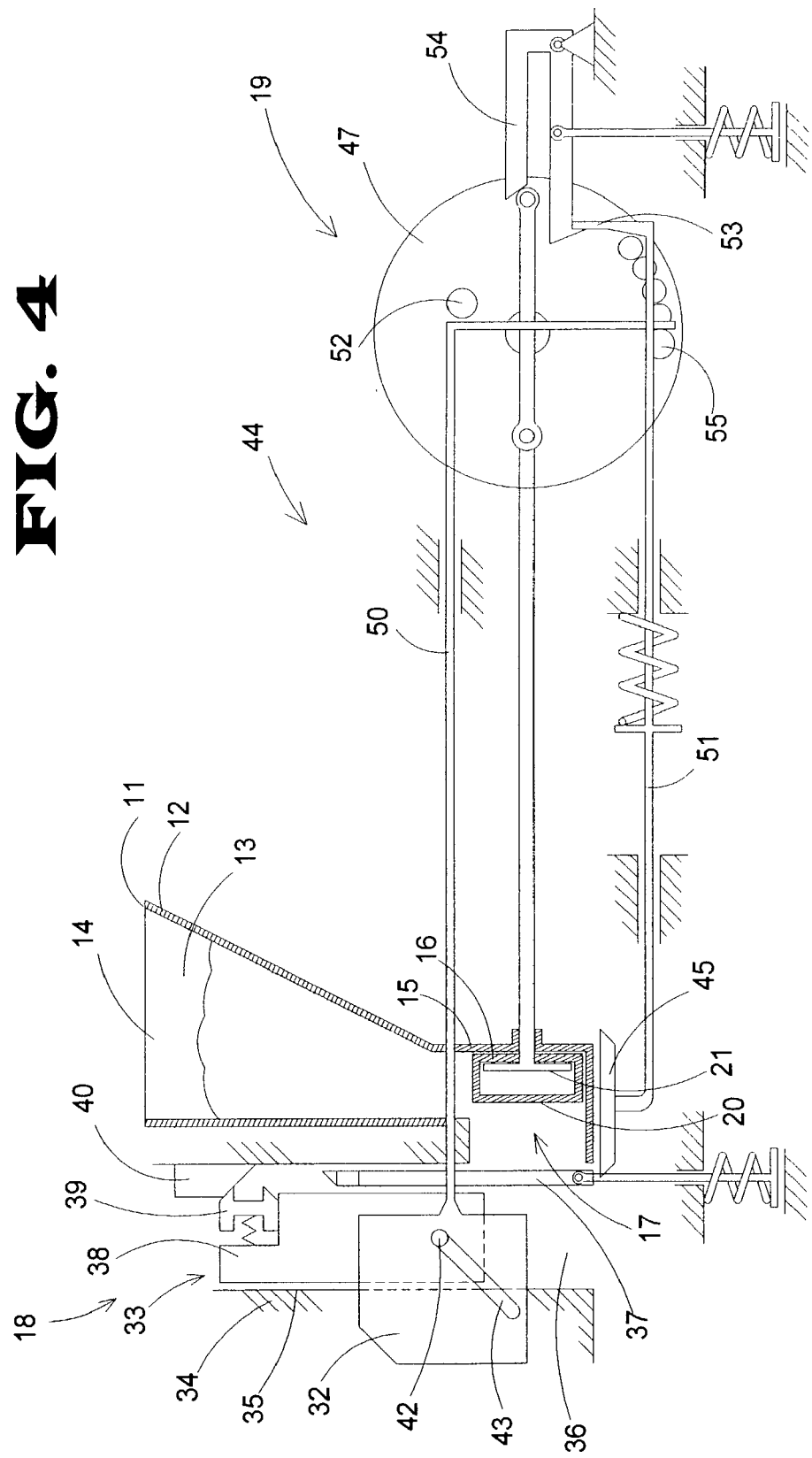
FIG. 4 is a schematic view of step 2 in the cycle of the present invention.
Figure 5:
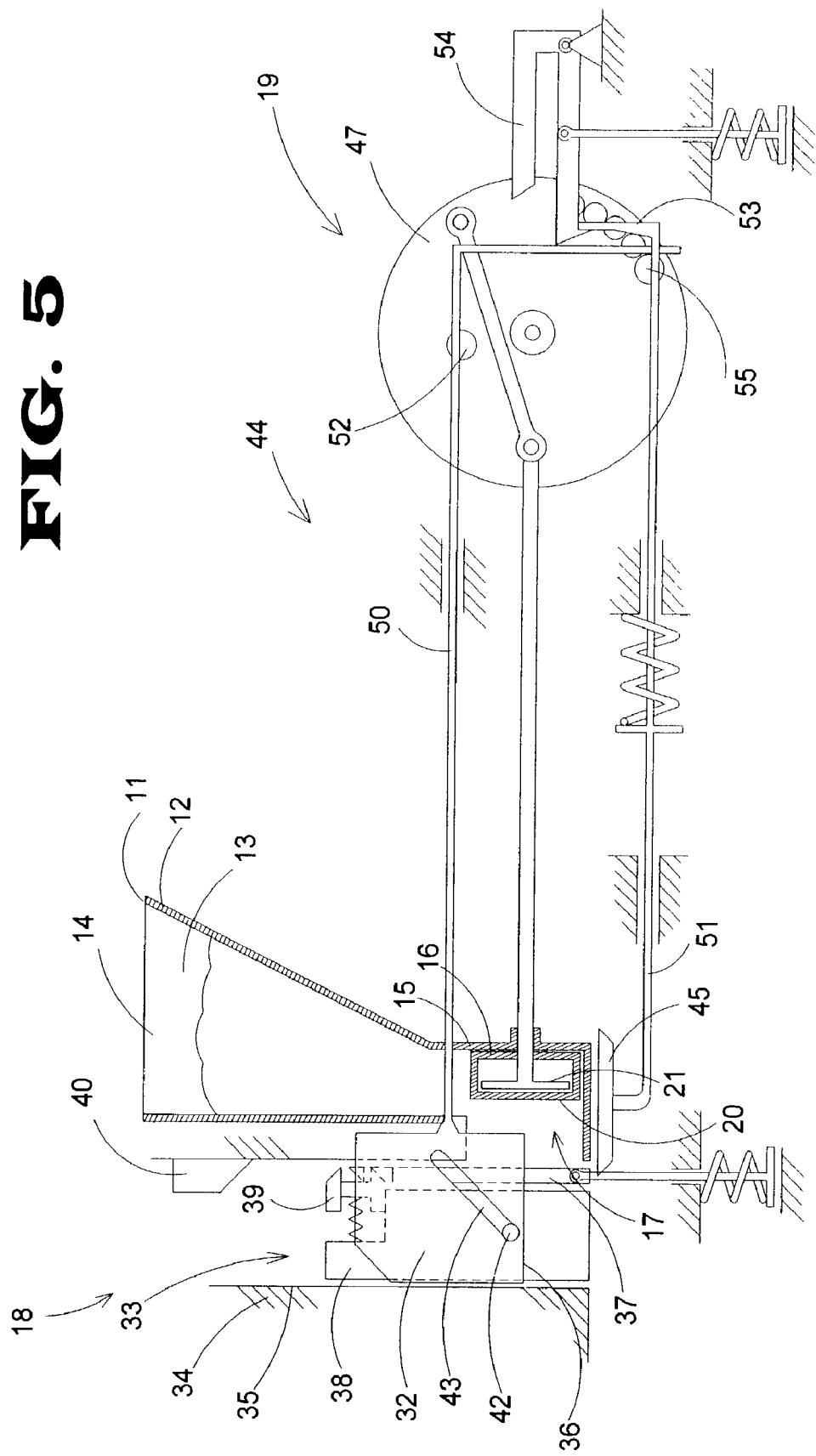
FIG. 5 is a schematic view of step 3 in the cycle of the present invention.
Figure 6:
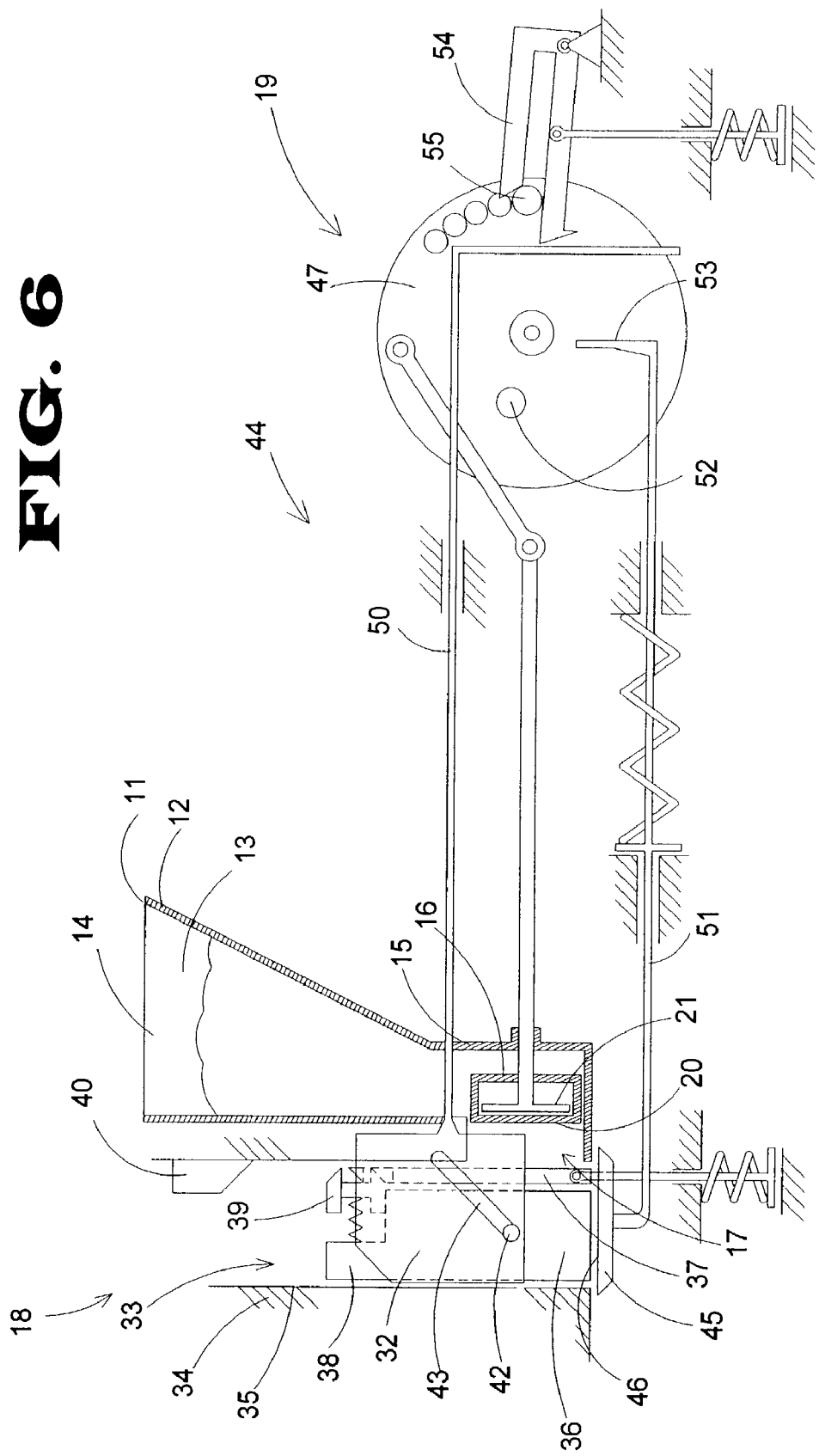
FIG. 6 is a schematic view of step 4 in the cycle of the present invention.
Figure 7:
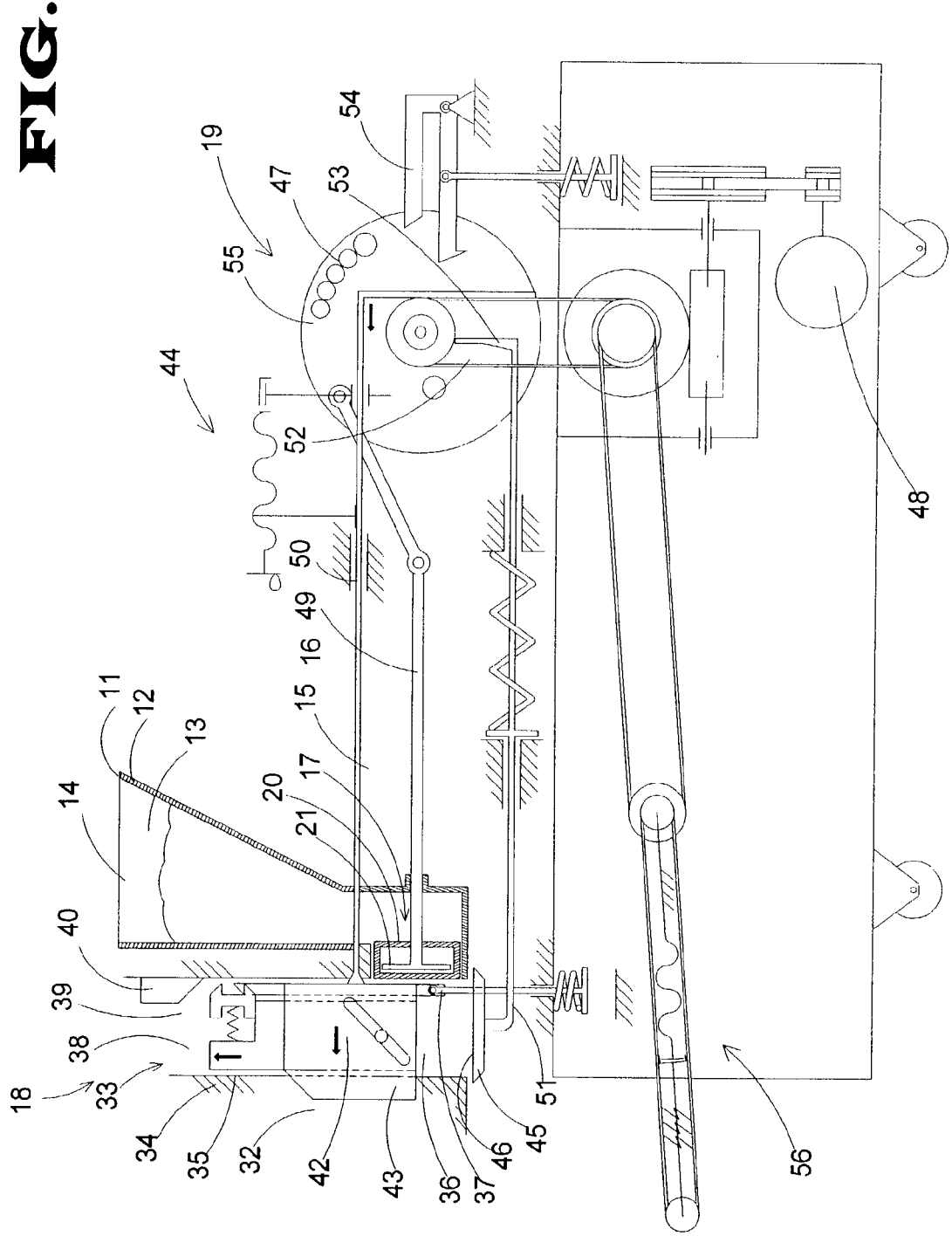
FIG. 7 is a schematic view of step 5 in the cycle of the present invention before the cycle starts over again.
Figure 8:
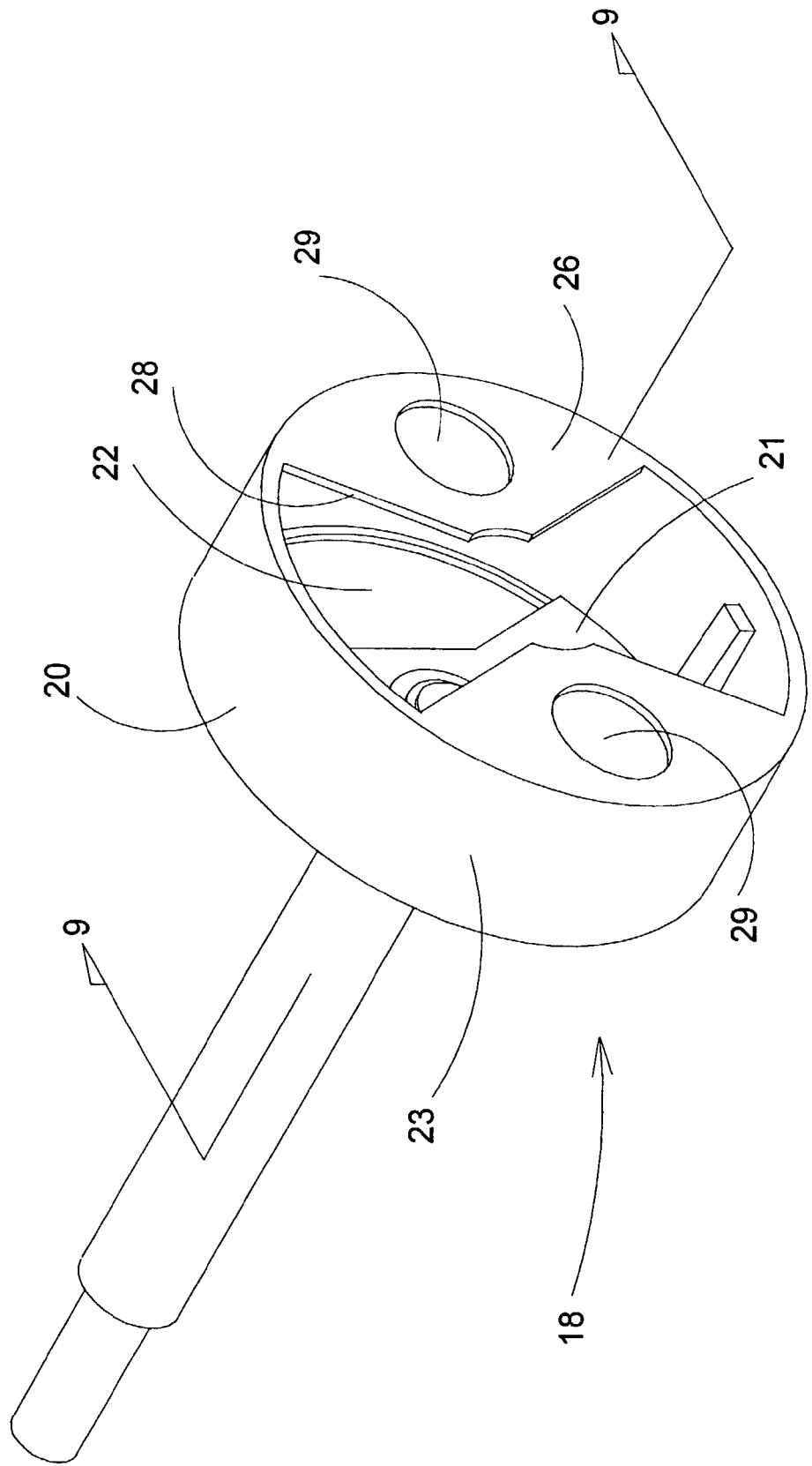
FIG. 8 is a perspective view of the piston assembly of the present invention.
Figure 9:
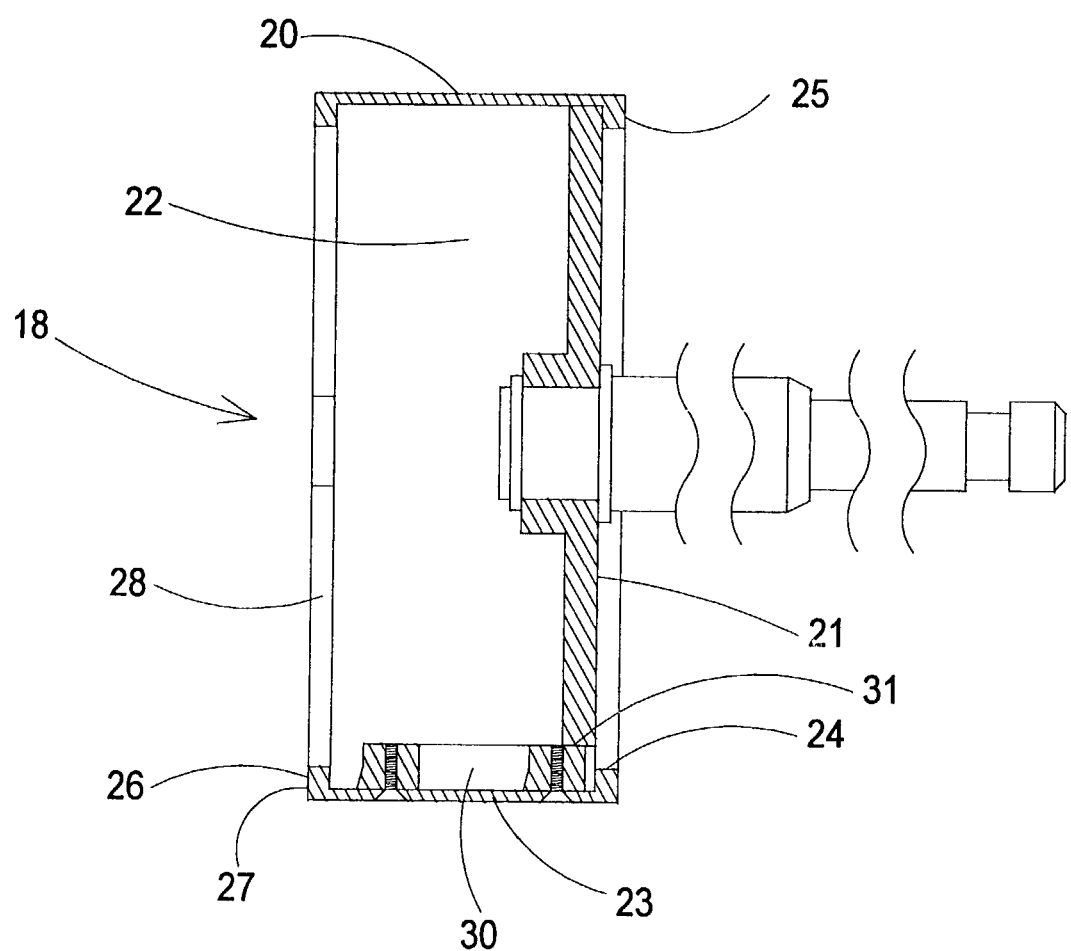
FIG. 9 is a cross-sectional view of the piston assembly of the present invention taken along line 9—9 of FIG. 8.
Figure 10:
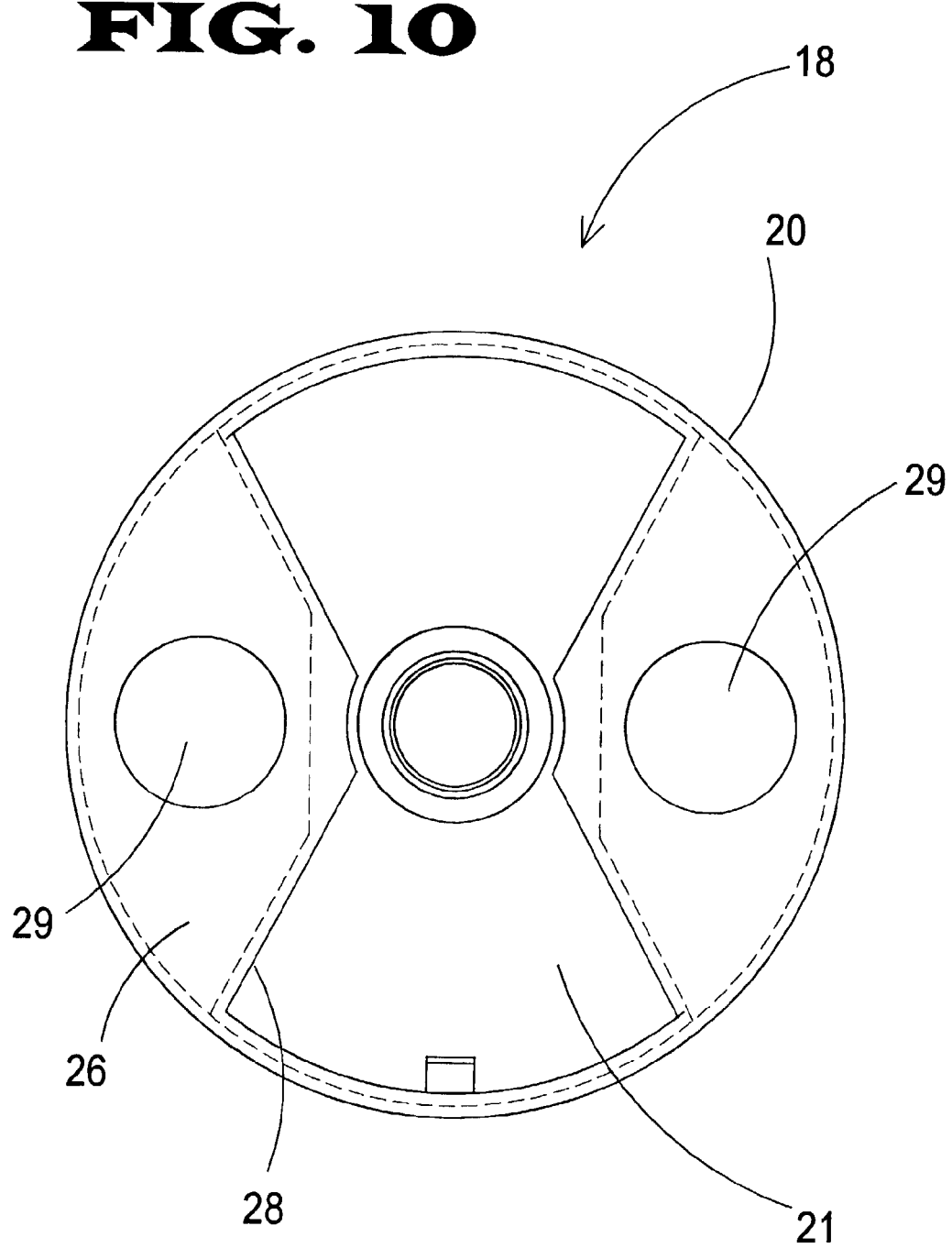
FIG. 10 is a front view of the piston assembly of the present invention.
Figure 11:
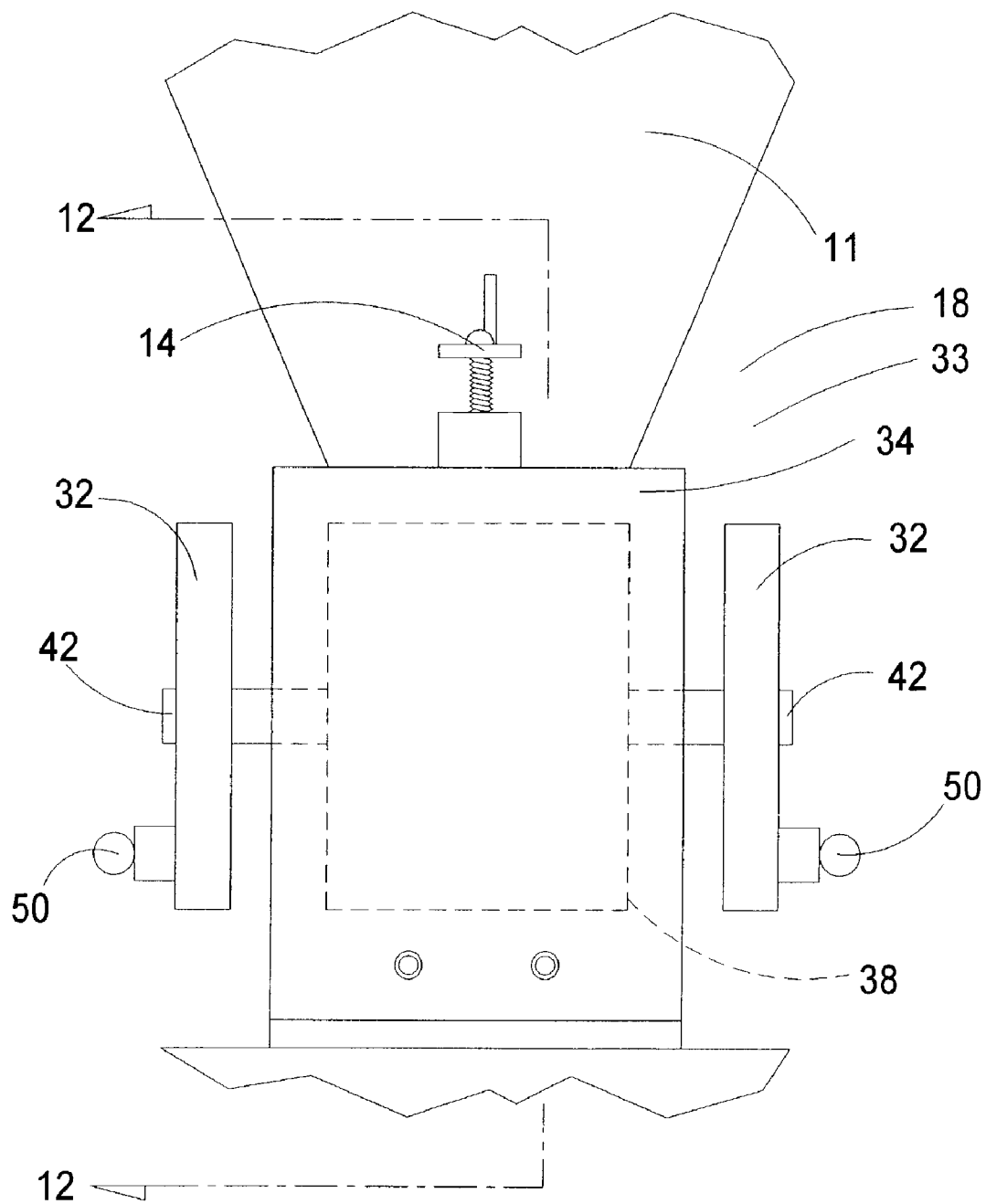
FIG. 11 is a front view of the dividing assembly of the present invention.
Figure 12:
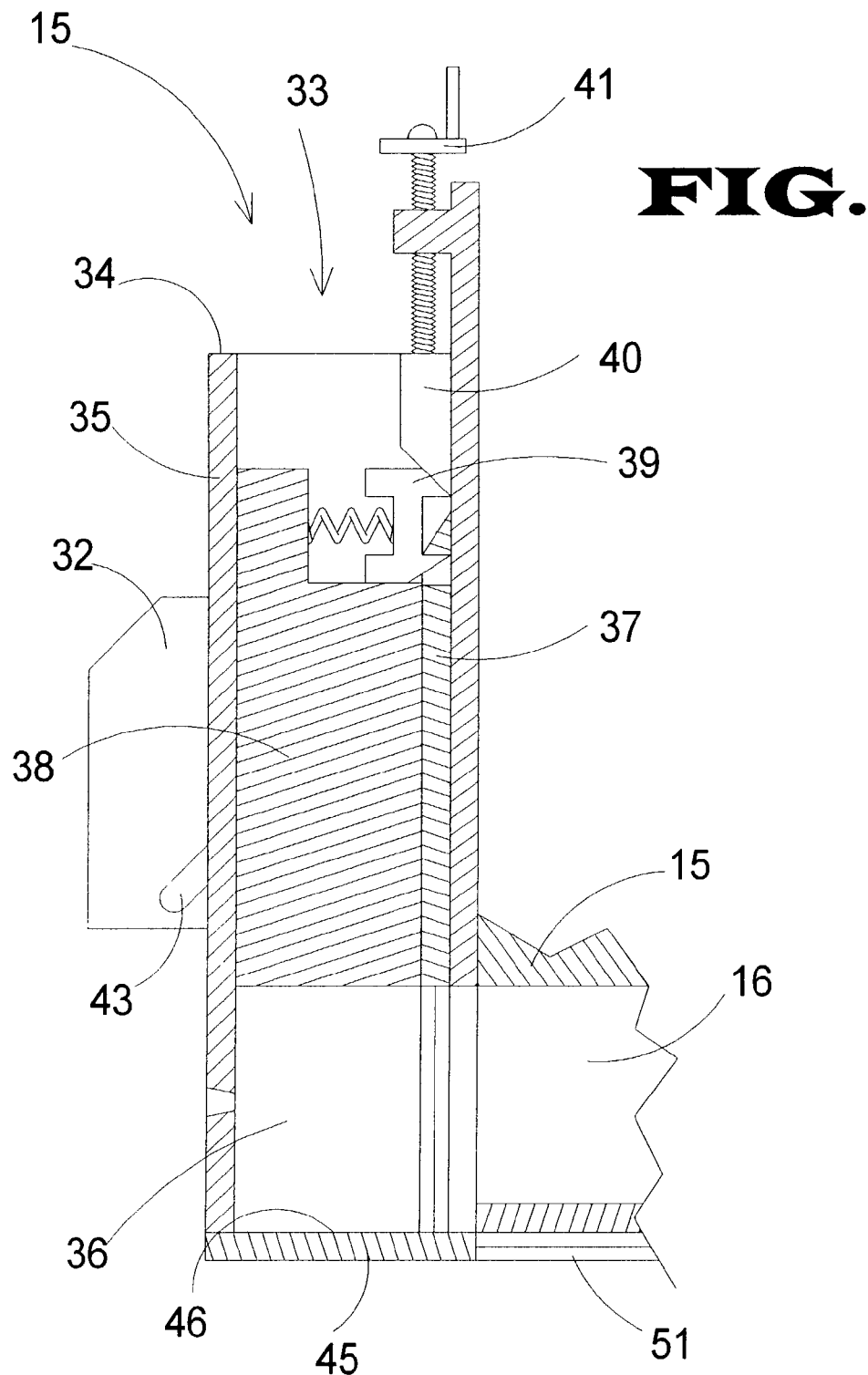
FIG. 12 is a cross-sectional view of the dividing assembly of the present invention.

With reference now to the drawings, and in particular to FIGS. 1 through 12 thereof, a new dough dividing apparatus embodying the principles and concepts of the present invention and generally designated by the reference numeral 10 will be described.

As best illustrated in FIGS. 1 through 12, the dough dividing apparatus 10 generally comprises a bin portion 11 comprising a perimeter wall 12. The perimeter wall 12 defines an interior space 13 of the bin portion 11. The interior space 13 of the bin portion 11 has an open upper end 14. The open upper end 14 of the interior space 13 is designed for permitting dough to be placed in the interior space 13 of the bin portion 11.

A cylinder 15 is coupled to the bin portion 11 opposite the open top end of the interior space 13 of the bin portion 11. A lumen 16 of the cylinder 15 is in fluid communication with the interior space 13 of the bin portion 11.

A piston assembly 17 is slidably positioned in the lumen 16 of the cylinder 15. The piston assembly 17 is for drawing dough into the cylinder 15 and extruding dough from the cylinder 15 when the piston assembly 17 is slid in the cylinder 15.

A dividing assembly 18 is coupled to the cylinder 15 whereby the dividing assembly 18 is in fluid communication with the lumen 16 of the cylinder 15. The dividing assembly 18 is designed for receiving dough extruded from the cylinder 15 by the piston assembly 17. The dividing assembly 18 is designed for dividing the dough extruded from the cylinder 15.

A driving assembly 19 is operationally coupled to the piston assembly 17 and the dividing assembly 18. The driving assembly 19 is for actuating the piston assembly 17 whereby the piston assembly 17 slides in the lumen 16 of the cylinder 15. The driving assembly 19 is for actuating the dividing assembly 18 whereby the dividing assembly 18 is designed for dividing the dough extruded from the cylinder 15.

The piston assembly 17 comprises a sleeve member 20 and a head member 21. The sleeve member 20 is slidably positioned in the lumen 16 of the cylinder 15. The head member 21 is slidably positioned in a bore 22 of the sleeve member 20. The head member 21 is operationally coupled to the driving assembly 19 whereby the driving assembly 19 oscillates the head member 21 along a length of the sleeve member 20 which oscillates the sleeve member 20 along a length of the cylinder 15. The sleeve member 20 is positioned in the lumen 16 of the sleeve whereby a portion of the dough in the lumen 16 of the cylinder 15 is positioned between the sleeve member 20 and the cylinder 15 for providing a seal between the sleeve member 20 and the cylinder 15 for inhibiting contact between the cylinder 15 and the sleeve member 20 when the sleeve member 20 is oscillated along the length of the cylinder 15.

The sleeve member 20 comprises a peripheral wall 23. The peripheral wall 23 defines the bore 22 of the sleeve member 20. The sleeve member 20 comprises a rear lip portion 24 coupled to a rear end 25 of the peripheral wall 23. The sleeve member 20 comprises a front face portion 26 coupled to a front end 27 of the peripheral wall 23. The head member 21 is positioned between the front face portion 26 and the rear lip portion 24 of the sleeve member 20. The head member 21 engages the front face portion 26 of the sleeve member 20 for pushing the sleeve member 20 through the lumen 16 of the cylinder 15 towards the dividing assembly 18 for extruding dough from the cylinder 15 when the head member 21 is oscillated towards the dividing assembly 18. The head member 21 engages the rear lip portion 24 of the sleeve member 20 for creating a vacuum in the lumen 16 of the cylinder 15 for drawing the dough from the bin portion 11 into the lumen 16 of the cylinder 15 when the head member 21 is oscillated away from the dividing assembly 18.

The front face portion 26 of the sleeve member 20 comprises a central aperture 28. The central aperture 28 of the front face portion 26 is designed for permitting the dough in the lumen 16 of the cylinder 15 to pass through the front face when the sleeve member 20 is being drawn away from the dividing assembly 18. The head member 21 is for closing the central aperture 28 whereby the sleeve member 20 is designed for pushing a portion of the dough in the lumen 16 of the cylinder 15 into the dividing assembly 18 when the head member 21 is pushing the sleeve member 20 towards the dividing assembly 18.

The front face portion 26 of the sleeve member 20 comprises a pair of bypass apertures 29. One of the bypass apertures 29 is diametrically positioned to the other of the bypass apertures 29 whereby the central aperture 28 is positioned between the bypass apertures 29. The bypass apertures 29 are designed for permitting a portion of the dough positioned in the lumen 16 of the cylinder 15 to pass through the front face portion 26 of the sleeve member 20 when the sleeve member 20 is oscillated with respect to the cylinder 15.

The central aperture 28 of the front face portion 26 is substantially bow-tie shaped. The head member 21 is substantially bow-tie shaped. The head member 21 engages the front face portion 26 of the sleeve member 20 around the central aperture 28 of the front face portion 26 for closing the central aperture 28s when the head member 21 is pushing the sleeve member 20 towards the dividing assembly 18.

The sleeve member 20 comprises a guide portion 30. The guide portion 30 of the sleeve member 20 extends along the peripheral wall 23 between the rear lip portion 24 and the front face portion 26. The guide portion 30 extends into the bore 22 of the sleeve member 20 from the peripheral wall 23.

The head member 21 comprises a channel 31. The channel 31 of the head member 21 is slidably positioned over the guide portion 30 of the sleeve member 20 whereby the guide portion 30 is for maintaining alignment of the head member 21 with the sleeve member 20 when the head member 21 is oscillating in the bore 22 of the sleeve member 20.

The dividing assembly 18 comprises a pair of actuation plates 32 and a separating assembly 33. Each of the actuation plates 32 is operationally coupled to the driving assembly 19 whereby the driving assembly 19 is for horizontally moving the actuation of plates. The separating assembly 33 is operationally coupled to the actuation plates 32 whereby horizontal actuation of the actuation plates 32 vertically oscillates the separating assembly 33 with respect to the cylinder 15 for separating extruded dough from the cylinder 15 into substantially equal portions when the separating assembly 33 is in a fully raised position.

The separating assembly 33 comprises a housing 34. The housing 34 comprises an outer wall 35 defining a receiving space 36 of the housing 34. The receiving space 36 is in fluid communication with the lumen 16 of the cylinder 15 whereby the receiving space 36 of the housing 34 receives dough extruded from the lumen 16 of the cylinder 15. The housing 34 has at least one venting aperture positioned in the outer wall 35 of the housing whereby the venting aperture permits air to escape from the receiving space 36 when the dough is extruded from the cylinder 15. The sleeve member 20 of the piston assembly 17 may be substantially square shaped to allow to increase the amount of dough being pushed into the receiving space 36 from the cylinder 15.

The separating assembly 33 comprises a vertical shutter 37. The vertical shutter 37 is slidably coupled to the housing 34. The vertical shutter 37 is for selectively separating the receiving space 36 from the lumen 16 of the cylinder 15 and separating dough extruded from the lumen 16 of the cylinder 15 from dough remaining in the lumen 16 of the cylinder 15 when the vertical shutter 37 separates the receiving space 36 of the housing 34 from the lumen 16 of the cylinder 15.

The separating assembly 33 comprises a piston member 38. The piston member 38 is slidably positioned in the receiving space 36 of the housing 34. The piston member 38 of the separating assembly 33 is operationally coupled to the actuation plates 32 whereby horizontal motion of the actuation plates 32 vertically slides the piston in the receiving space 36 of the housing 34. The piston member 38 creates a vacuum in the receiving space 36 of the housing 34 for facilitating drawing of dough extruded from the lumen 16 of the cylinder 15 into the receiving space 36 when the piston is vertically slid upwards in the receiving space 36 of the housing 34 and the receiving space 36 is in fluid communication with the lumen 16 of the cylinder 15.

The separating assembly 33 comprises an engaging member 39. The engaging member 39 is slidably coupled to the piston member 38 whereby the engaging member 39 is biased away from the housing 34 towards the vertical shutter 37. The engaging member 39 selectively engages the vertical shutter 37 whereby the vertical shutter 37 moves with the piston member 38 of the separating assembly 33 when the engaging member 39 engages the vertical shutter 37.

The dividing assembly 18 comprises a release member 55 40. The release member 55 40 is positioned adjacent the housing 34 of the separating assembly 33 of the dividing assembly 18. The release member 55 40 selectively engages the engaging member 39 of the separating assembly 33 for biasing the engaging member 39 away from the vertical shutter 37 whereby the vertical shutter 37 is released and is biased towards the receiving space 36 of the housing 34 for separating dough positioned in the receiving space 36 of the housing 34 from dough positioned in the lumen 16 of the cylinder 15 when the piston member 38 is slid in the housing 34 to the highest vertical position of the piston member 38.

The dividing assembly 18 comprises a setting portion 41. The setting portion 41 is adjustably coupled to the release member 55 40 whereby the setting portion 41 is for adjusting a distance between the release member 55 40 and the vertical shutter 37 of the separating assembly 33. The setting portion 41 is for adjusting the amount of dough in the receiving portion separated by the vertical shutter 37 from the dough positioned in the lumen 16 of the cylinder 15 by adjusting the length between the bottom most position of the piston member 38 and the engaging member 39 contacting the release member 55 40 and actuating release of the vertical shutter 37.

The piston member 38 of the separating assembly 33 comprises a pair of arms 42. Each of the actuation plates 32 of the dividing assembly 18 has a diagonal slot 43 extending diagonally across the associated one of the actuation plates 32. Each of the arms 42 is slidably positioned in the diagonal slot 43 of one of the actuation plates 32 whereby horizontal movement of the actuation plates 32 slides the arms 42 in the diagonal slot 43 of the associated one of the actuation plates 32 for vertically moving the piston in the housing 34 of the separating assembly 33.

An adjustment assembly 44 is operationally coupled between the actuation plates 32 and the driving assembly 19. The adjustment assembly 44 is for adjusting a distance through which the actuation plates 32 are moved through by the driving assembly 19 when the adjustment assembly 44 is actuated by the user.

The dividing assembly 18 comprises a horizontal shutter 45. The horizontal shutter 45 is operationally coupled to the driving assembly 19. The horizontal shutter 45 selectively closes a bottom opening 46 of the receiving space 36 of the housing 34 of the separation assembly when the horizontal shutter 45 is being biased towards the housing 34 of the separation assembly. The horizontal shutter 45 is actuated by the driving assembly 19 for withdrawing the horizontal shutter 45 from the housing 34 for releasing dough extruded into the receiving space 36 through the open bottom of the receiving space 36 for processing by the user.

The driving assembly 19 comprises a flywheel 47 and a motor means 48 for rotating the flywheel 47. The flywheel 47 is operationally coupled to the dividing assembly 18 and the piston assembly 17. The motor means 48 is operationally coupled to the flywheel 47 whereby rotation of the flywheel 47 actuates the piston assembly 17 and the dividing assembly 18. The driving assembly 19 has a drive arm 49 being coupled to the head member 21 of the piston assembly 17. The drive arm 49 is rotatably coupled to the flywheel 47 whereby rotation of the flywheel 47 generates substantially linear movement of the drive arm 49 for oscillating the head member 21 in the bore 22 of the sleeve member 20 of the piston assembly 17.

The dividing assembly 18 comprises a pair of actuation arms 50. Each of the actuation arms 50 is coupled between one of the actuation plates 32 and the adjustment assembly 44. The adjustment assembly 44 is operationally coupled to the flywheel 47 of the driving assembly 19 whereby rotation of the flywheel 47 provides linear movement of the adjustment assembly 44 and the actuation arms 50 of the dividing assembly 18. The adjustment assembly 44 permits adjustability of the amount of linear movement of the actuation arms 50 produced by the rotation of the flywheel 47 of the driving assembly 19.

The dividing assembly 18 comprises a translating arm 51. The translating arm 51 is coupled to the horizontal shutter 45 of the dividing assembly 18 and is operationally coupled to the flywheel 47 of the driving assembly 19. The driving assembly 19 has a catch member 52 coupled to the flywheel 47. The catch member 52 selectively engages an engagement tab 53 of the translating arm 51 of the dividing assembly 18 and draws the horizontal shutter 45 away from the housing 34 of the separating assembly 33 and allows the dough to be drop from the receiving space 36 of the separating assembly 33. A catch lever 54 selectively engages the engagement tab 53 of translating arm 51 and retains the horizontal shutter 45 in a withdrawn position. The driving assembly 19 comprises a release member 55 40 coupled to the flywheel 47 that selectively engages the catch lever 54 to release the translating arm 51 allowing the translating arm 51 to be biased back towards the housing 34 of separating assembly 33.

A conveyor assembly 56 is operationally coupled to the motor means 48 of the driving assembly 19. The conveyor assembly 56 is positioned below the dividing assembly 18 whereby dough dropped from the dividing assembly 18 is received by the conveyor assembly 56 and transported to be used by the user.

In use, the user places dough into the interior space 13 of the bin portion 11. The motor means 48 is then turned on and the flywheel 47 is rotating. The piston assembly 17 draws dough from the interior space 13 of the bin portion 11 and extrudes some of the dough into the receiving space 36 of the dividing assembly 18. The vertical gate is released from the piston member 38 of the separating assembly 33 and separates the dough in the receiving space 36 from the dough in the lumen 16 of the cylinder 15. The horizontal shutter 45 is withdrawn from the housing 34 of the separating assembly 33 and the dough is forced out of the receiving space 36 by the piston member 38 of the separating assembly 33 onto the conveyor to be processed by the user.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| Index of Elements for DOUGH DIVIDING APPARATUS |
| --- |
| 10. DOUGH DIVIDING APPARATUS |
| 11. bin portion |
| 12. perimeter wall |
| 13. interior space |
| 14. open upper end |
| 15. cylinder |
| 16. lumen |
| 17. piston assembly |
| 18. dividing assembly |
| 19. driving assembly |
| 20. sleeve member |
| 21. head member |
| 22. bore |
| 23. peripheral wall |
| 24. rear lip portion |
| 25. rear end |
| 26. front face portion |
| 27. front end |
| 28. central aperture |
| 29. bypass aperture |
| 30. guide portion |
| 31. channel |
| 32. actuation plate |
| 33. separating assembly |
| 34. housing |
| 35. outer wall |
| 36. receiving space |
| 37. vertical shutter |
| 38. piston member |
| 39. engaging member |
| 40. release member |
| 41. setting portion |
| 42. arm |
| 43. diagonal slot |
| 44. adjustment assembly |
| 45. horizontal shutter |
| 46. bottom opening |
| 47. flywheel |
| 48. motor means |
| 49. drive arm |
| 50. actuation arm |
| 51. translating arm |
| 52. catch member |
| 53. engagement tab |
| 54. catch lever |
| 55. release member |
| 56. conveyor assembly |
| 57. |
| 58. |
| 59. |
| 60. |
| 61. |
| 62. |
| 63. |
| 64. |
| 65. |
| 66. |
| 67. |
| 68. |
| 69. |
| 70. |
| 71. |

| Index of Elements for DOUGH DIVIDING APPARATUS |
| --- |
| 72. |
| 73. |
| 74. |
| 75. |
| 76. |
| 77. |
| 78. |
| 79. |

I claim:

1. A dough dividing apparatus for evenly dividing dough, the dough dividing apparatus comprising:

a bin portion comprising a perimeter wall, said perimeter wall defining an interior space of said bin portion, said interior space of said bin portion having an open upper end, said open upper end of said interior space being adopted for permitting dough to be placed in said interior space of said bin portion;

a cylinder being coupled to said bin portion opposite said open top end of said interior space of said bin portion, a lumen of said cylinder being in fluid communication with said interior space of said bin portion;

a piston assembly being slidably positioned in said lumen of said cylinder, said piston assembly being for drawing dough into said cylinder and extruding dough from said cylinder when said piston assembly is slid in said cylinder;

a dividing assembly being coupled to said cylinder such that said dividing assembly is in fluid communication with said lumen of said cylinder, said dividing assembly being adopted for receiving dough extruded from said cylinder by said piston assembly, said dividing assembly being adopted for dividing the dough extruded from said cylinder; and a driving assembly being operationally coupled to said piston assembly and said driving assembly, said driving assembly being for actuating said piston assembly such that said piston assembly slides in said lumen of said cylinder, said driving assembly being for actuating said dividing assembly such that said dividing assembly is adapted for dividing the dough extruded from the cylinder;

said piston assembly comprising a sleeve member and a head member, said sleeve member being slidably positioned in said lumen of said cylinder, said head member being slidably positioned in a bore of said sleeve member, said head member being operationally coupled to said driving assembly such that said driving assembly oscillates said head member along a length of said sleeve member which oscillates said sleeve member along a length of said cylinder, said sleeve member being positioned in said lumen of said sleeve such that a portion of the dough in said lumen of said cylinder is positioned between said sleeve member and said cylinder for providing a seal between said sleeve member and said cylinder for inhibiting contact between said cylinder and said sleeve member when said sleeve member is oscillated along the length of said cylinder;

said sleeve member comprising a peripheral wall, said peripheral wall defining said bore of said sleeve member, said sleeve member comprising a rear lip portion coupled to a rear end of said peripheral wall, said sleeve member comprising a front face portion coupled to a front end of said peripheral wall, said head member being positioned between said front face portion and said rear lip portion of said sleeve member, said head member engaging said front face portion of said sleeve member for pushing said sleeve member through said lumen of said cylinder towards said dividing assembly for extruding dough from said cylinder towards said dividing assembly for extruding dough from said cylinder when said head member is oscillated towards said dividing assembly, said head member engaging said rear lip portion of said sleeve member for creating a vacuum in said lumen of said cylinder for drawing the dough from said bin portion into said lumen of said cylinder when said head member is oscillated away from said dividing assembly;

said front face portion of said sleeve member comprising a central aperture, said central aperture of said front face portion being adapted for permitting the dough in said lumen of said cylinder to pass through said front face when said sleeve member is being drawn away from said dividing assembly, said head member being for closing said central aperture such that said sleeve member is adapted for pushing a portion of the dough in said lumen of said cylinder into said dividing assembly when said head member is pushing said sleeve member towards said dividing assembly;

said front face portion of said sleeve member comprising a pair of bypass apertures, one of said bypass apertures being diametrically positioned to the other of said bypass apertures such that said central aperture is positioned between said bypass apertures, said bypass apertures being adapted for permitting a portion of the dough positioned in said lumen of said cylinder to pass through said front face portion of said sleeve member when said sleeve member is oscillated with respect to said cylinder.

2. A dough dividing apparatus for evenly dividing dough, the dough dividing apparatus comprising:

a bin portion comprising a perimeter wall, said perimeter wall defining an interior space of said bin portion, said interior space of said bin portion having an open upper end, said open upper end of said interior space being adopted for permitting dough to be placed in said interior space of said bin portion;

a cylinder being coupled to said bin portion opposite said open top end of said interior space of said bin portion, a lumen of said cylinder being in fluid communication with said interior space of said bin portion;

a piston assembly being slidably positioned in said lumen of said cylinder, said piston assembly being for drawing dough into said cylinder and extruding dough from said cylinder when said piston assembly is slid in said cylinder;

a dividing assembly being coupled to said cylinder such that said dividing assembly is in fluid communication with said lumen of said cylinder, said dividing assembly being adopted for receiving dough extruded from said cylinder by said piston assembly, said dividing assembly being adopted for dividing the dough extruded from said cylinder; and a driving assembly being operationally coupled to said piston assembly and said driving assembly, said driving assembly being for actuating said piston assembly such that said piston assembly slides in said lumen of said cylinder, said driving assembly being for actuating said dividing assembly such that said dividing assembly is adapted for dividing the dough extruded from the cylinder;

said piston assembly comprising a sleeve member and a head member, said sleeve member being slidably positioned in said lumen of said cylinder, said head member being slidably positioned in a bore of said sleeve member, said head member being operationally coupled to said driving assembly such that said driving assembly oscillates said head member along a length of said sleeve member which oscillates said sleeve member along a length of said cylinder, said sleeve member being positioned in said lumen of said sleeve such that a portion of the dough in said lumen of said cylinder is positioned between said sleeve member and said cylinder for providing a seal between said sleeve member and said cylinder for inhibiting contact between said cylinder and said sleeve member when said sleeve member is oscillated along the length of said cylinder;

said sleeve member comprising a peripheral wall, said peripheral wall defining said bore of said sleeve member, said sleeve member comprising a rear lip portion coupled to a rear end of said peripheral wall, said sleeve member comprising a front face portion coupled to a front end of said peripheral wall, said head member being positioned between said front face portion and said rear lip portion of said sleeve member, said head member engaging said front face portion of said sleeve member for pushing said sleeve member through said lumen of said cylinder towards said dividing assembly for extruding dough from said cylinder towards said dividing assembly for extruding dough from said cylinder when said head member is oscillated towards said dividing assembly, said head member engaging said rear lip portion of said sleeve member for creating a vacuum in said lumen of said cylinder for drawing the dough from said bin portion into said lumen of said cylinder when said head member is oscillated away from said dividing assembly;

said front face portion of said sleeve member comprising a central aperture, said central aperture of said front face portion being adapted for permitting the dough in said lumen of said cylinder to pass through said front face when said sleeve member is being drawn away from said dividing assembly, said head member being for closing said central aperture such that said sleeve member is adapted for pushing a portion of the dough in said lumen of said cylinder into said dividing assembly when said head member is pushing said sleeve member towards said dividing assembly;

said central aperture of said front face portion being substantially bow-tie shaped, said head member being substantially bow-tie shaped, said head member engaging said front face portion of said sleeve member around said central aperture of said front face portion for closing said central apertures when said head member is pushing said sleeve member towards said dividing assembly.

3. A dough dividing apparatus for evenly dividing dough, the dough dividing apparatus comprising:

a bin portion comprising a perimeter wall, said perimeter wall defining an interior space of said bin portion, said interior space of said bin portion having an open upper end, said open upper end of said interior space being adopted for permitting dough to be placed in said interior space of said bin portion;

a cylinder being coupled to said bin portion opposite said open top end of said interior space of said bin portion, a lumen of said cylinder being in fluid communication with said interior space of said bin portion;

a piston assembly being slidably positioned in said lumen of said cylinder, said piston assembly being for drawing dough into said cylinder and extruding dough from said cylinder when said piston assembly is slid in said cylinder;

a dividing assembly being coupled to said cylinder such that said dividing assembly is in fluid communication with said lumen of said cylinder, said dividing assembly being adopted for receiving dough extruded from said cylinder by said piston assembly, said dividing assembly being adopted for dividing the dough extruded from said cylinder; and a driving assembly being operationally coupled to said piston assembly and said driving assembly, said driving assembly being for actuating said piston assembly such that said piston assembly slides in said lumen of said cylinder, said driving assembly being for actuating said dividing assembly such that said dividing assembly is adapted for dividing the dough extruded from the cylinder;

said piston assembly comprising a sleeve member and a head member, said sleeve member being slidably positioned in said lumen of said cylinder, said head member being slidably positioned in a bore of said sleeve member, said head member being operationally coupled to said driving assembly such that said driving assembly oscillates said head member along a length of said sleeve member which oscillates said sleeve member along a length of said cylinder, said sleeve member being positioned in said lumen of said sleeve such that a portion of the dough in said lumen of said cylinder is positioned between said sleeve member and said cylinder for providing a seal between said sleeve member and said cylinder for inhibiting contact between said cylinder and said sleeve member when said sleeve member is oscillated along the length of said cylinder;

said sleeve member comprising a peripheral wall, said peripheral wall defining said bore of said sleeve member, said sleeve member comprising a rear lip portion coupled to a rear end of said peripheral wall, said sleeve member comprising a front face portion coupled to a front end of said peripheral wall, said head member being positioned between said front face portion and said rear lip portion of said sleeve member, said head member engaging said front face portion of said sleeve member for pushing said sleeve member through lumen of said cylinder towards said dividing assembly for extruding dough from said cylinder towards said dividing assembly for extruding dough from said cylinder when said head member is oscillated towards said dividing assembly, said head member engaging said rear lip portion of said sleeve member for creating a vacuum in said lumen of said cylinder for drawing the dough from said bin portion into said lumen of said cylinder when said head member is oscillated away from said dividing assembly;

said sleeve member comprising a guide portion, said guide portion of said sleeve member extending along said peripheral wall between said rear lip portion and said front face portion, said guide portion extending into said bore of said sleeve member from said peripheral wall; and said head member comprising a channel, said channel of said head member being slidably positioned over said guide portion of said sleeve member such that said guide portion is for maintaining alignment of said head member with said sleeve member when said head member is oscillating in said bore of said sleeve member.

4. A dough dividing apparatus for evenly dividing dough, the dough dividing apparatus comprising:

a bin portion comprising a perimeter wall, said perimeter wall defining an interior space of said bin portion, said interior space of said bin portion having an open upper end, said open upper end of said interior space being adopted for permitting dough to be placed in said interior space of said bin portion;

a cylinder being coupled to said bin portion opposite said open top end of said interior space of said bin portion, a lumen of said cylinder being in fluid communication with said interior space of said bin portion;

a piston assembly being slidably positioned in said lumen of said cylinder, said piston assembly being for drawing dough into said cylinder and extruding dough from said cylinder when said piston assembly is slid in said cylinder;

a dividing assembly being coupled to said cylinder such that said dividing assembly is in fluid communication with said lumen of said cylinder, said dividing assembly being adopted for receiving dough extruded from said cylinder by said piston assembly, said dividing assembly being adopted for dividing the dough extruded from said cylinder; and a driving assembly being operationally coupled to said piston assembly and said driving assembly, said driving assembly being for actuating said piston assembly such that said piston assembly slides in said lumen of said cylinder, said driving assembly being for actuating said dividing assembly such that said dividing assembly is adapted for dividing the dough extruded from the cylinder;

said dividing assembly comprising a pair of actuation plates and a separating assembly, each of said actuation plates being operationally coupled to said driving assembly such that said driving assembly being for horizontally moving said actuation of plates, said separating assembly being operationally coupled to said actuation plates such that horizontal actuation of said actuation plates vertically oscillating said separating assembly with respect to said cylinder for separating assembly with respect to said cylinder for separating extruded dough from said cylinder into substantially equal portions when said separating assembly is in a fully raised position;

said separating assembly comprising a housing, said housing comprising an outer wall defining a receiving space of said housing, said receiving space being in fluid communication with said lumen of said cylinder such that said receiving space of said housing receives dough extruded from said lumen of said cylinder;

said separating assembly comprising a vertical shutter, said vertical shutter being slidably coupled to said housing, said vertical shutter being for selectively separating said receiving space from said lumen of said cylinder and separating dough extruded from said lumen of said cylinder from dough remaining in said lumen of said cylinder when said vertical shutter separates said receiving space of said housing from said lumen of said cylinder;

said separating assembly comprising a piston member, said piston member being slidably positioned in said receiving space of said housing, said piston member of said separating assembly being operationally coupled to said actuation plates such that horizontal motion of said actuation plates vertically slides said piston in said receiving space of said housing for facilitating drawing of dough extruded from said lumen of said cylinder into said receiving space when said piston is vertically slid upwards in said receiving space of said housing and said receiving space is in fluid communication with said lumen of said cylinder;

said piston member of said separating assembly comprising a pair of arms, each of said actuation plates of said dividing assembly having a diagonal slot extending diagonally across the associated one of said actuation plates, each of said arms being slidably positioned in said diagonal slot of one of said actuation plates such that horizontal movement of said actuation plates slides said arms in said diagonal slot of the associated one of said actuation plates for vertically moving said piston in said housing of said separating assembly.

5. A dough dividing apparatus for evenly dividing dough, the dough dividing apparatus comprising:

a bin portion comprising a perimeter wall, said perimeter wall defining an interior space of said bin portion, said interior space of said bin portion having an open upper end, said open upper end of said interior space being adapted for permitting dough to be placed in said interior space of said bin portion;

a cylinder being coupled to said bin portion opposite said open top end of said interior space of said bin portion, a lumen of said cylinder being in fluid communication with said interior space of said bin portion;

a piston assembly being slidably positioned in said lumen of said cylinder, said piston assembly being for drawing dough into said cylinder and extruding dough from said cylinder when said piston assembly is slid in said cylinder;

a dividing assembly being coupled to said cylinder such that said dividing assembly is in fluid communication with said lumen of said cylinder, said dividing assembly being adapted for receiving dough extruded from said cylinder by said piston assembly, said dividing assembly being adapted for dividing the dough extruded from said cylinder;

a driving assembly being operationally coupled to said piston assembly and said dividing assembly, said driving assembly being for actuating said piston assembly such that said piston assembly slides in said lumen of said cylinder, said driving assembly being for actuating said dividing assembly such that said dividing assembly is adapted for dividing the dough extruded from the cylinder;

said piston assembly comprising a sleeve member and a head member, said sleeve member being slidably positioned in said lumen of said cylinder, said head member being slidably positioned in a bore of said sleeve member, said head member being operationally coupled to said driving assembly such that said driving assembly oscillates said head member along a length of said sleeve member which oscillates said sleeve member along a length of said cylinder, said sleeve member being positioned in said lumen of said sleeve such that a portion of the dough in said lumen of said cylinder is positioned between said sleeve member and said cylinder for providing a seal between said sleeve member and said cylinder for inhibiting contact between said cylinder and said sleeve member when said sleeve member is oscillated along the length of said cylinder;

said sleeve member comprising a peripheral wall, said peripheral wall defining said bore of said sleeve member, said sleeve member comprising a rear lip portion coupled to a rear end of said peripheral wall, said sleeve member comprising a front face portion coupled to a front end of said peripheral wall, said head member being positioned between said front face portion and said rear lip portion of said sleeve member, said head member engaging said front face portion of said sleeve member for pushing said sleeve member through said lumen of said cylinder towards said dividing assembly for extruding dough from said cylinder when said head member is oscillated towards said dividing assembly, said head member engaging said rear lip portion of said sleeve member for creating a vacuum in said lumen of said cylinder for drawing the dough from said bin portion into said lumen of said cylinder when said head member is oscillated away from said dividing assembly;

said front face portion of said sleeve member comprising a central aperture, said central aperture of said front face portion being adapted for permitting the dough in said lumen of said cylinder to pass through said front face when said sleeve member is being drawn away from said dividing assembly, said head member being for closing said central aperture such that said sleeve member is adapted for pushing a portion of the dough in said lumen of said cylinder into said dividing assembly when said head member is pushing said sleeve member towards said dividing assembly;

said front face portion of said sleeve member comprising a pair of bypass apertures, one of said bypass apertures being diametrically positioned to the other of said bypass apertures such that said central aperture is positioned between said bypass apertures, said bypass apertures being adapted for permitting a portion of the dough positioned in said lumen of said cylinder to pass through said front face portion of said sleeve member when said sleeve member is oscillated with respect to said cylinder;

said central aperture of said front face portion being substantially bow-tie shaped, said head member being substantially bow-tie shaped, said head member engaging said front face portion of said sleeve member around said central aperture of said front face portion for closing said central apertures when said head member is pushing said sleeve member towards said dividing assembly;

said sleeve member comprising a guide portion, said guide portion of said sleeve member extending along said peripheral wall between said rear lip portion and said front face portion, said guide portion extending into said bore of said sleeve member from said peripheral wall;

said head member comprising a channel, said channel of said head member being slidably positioned over said guide portion of said sleeve member such that said guide portion is for maintaining alignment of said head member with said sleeve member when said head member is oscillating in said bore of said sleeve member;

said dividing assembly comprising a pair of actuation plates and a separating assembly, each of said actuation plates being operationally coupled to said driving assembly such that said driving assembly being for horizontally moving said actuation of plates, said separating assembly being operationally coupled to said actuation plates such that horizontal actuation of said actuation plates vertically oscillating said separating assembly with respect to said cylinder for separating extruded dough from said cylinder into substantially equal portions when said separating assembly is in a fully raised position;

said separating assembly comprising a housing, said housing comprising an outer wall defining a receiving space of said housing, said receiving space being in fluid communication with said lumen of said cylinder such that said receiving space of said housing receives dough extruded from said lumen of said cylinder;

said separating assembly comprising a vertical shutter, said vertical shutter being slidably coupled to said housing, said vertical shutter being for selectively separating said receiving space from said lumen of said cylinder and separating dough extruded from said lumen of said cylinder from dough remaining in said lumen of said cylinder when said vertical shutter separates said receiving space of said housing from said lumen of said cylinder;

said separating assembly comprising a piston member, said piston member being slidably positioned in said receiving space of said housing, said piston member of said separating assembly being operationally coupled to said actuation plates such that horizontal motion of said actuation plates vertically slides said piston in said receiving space of said housing, said piston member creating a vacuum in said receiving space of said housing for facilitating drawing of dough extruded from said lumen of said cylinder into said receiving space when said piston is vertically slid upwards in said receiving space of said housing and said receiving space is in fluid communication with said lumen of said cylinder;

said separating assembly comprising an engaging member, said engaging member being slidably coupled to said piston member such that said engaging member is biased away from said housing towards said vertical shutter, said engaging member selectively engaging said vertical shutter such that said vertical shutter moves with said piston member of said separating assembly when said engaging member engages said vertical shutter;

said dividing assembly comprising a release member, said release member being positioned adjacent said housing of said separating assembly of said dividing assembly, said release member selectively engaging said engaging member of said separating assembly for biasing said engaging member away from said vertical shutter such that said vertical shutter is released and is biased towards said receiving space of said housing for separating dough positioned in said receiving space of said housing from dough positioned in said lumen of said lumen of said cylinder when said piston member is slid in said housing to the highest vertical position of said piston member;

said dividing assembly comprising a setting portion, said setting portion being adjustably coupled to said release member such that said setting portion is for adjusting a distance between said release member and said vertical shutter of said separating assembly, said setting portion being for adjusting the amount of dough in said receiving portion separated by said vertical shutter from the dough positioned in said lumen of said cylinder by adjusting the length between the bottom most position of said piston member and said engaging member contracting said release member and actuating release of said vertical shutter;

said piston member of said separating assembly comprising a pair of arms, each of said actuation plates of said dividing assembly having a diagonal slot extending diagonally across the associated one of said actuation plates, each of said arms being slidably positioned in said diagonal slot of one of said actuation plates such that horizontal movement of said actuation plates slides said arms in said diagonal slot of the associated one of said actuation plates for vertically moving said piston in said housing of said separating assembly;

an adjustment assembly being operationally coupled between said actuation plates and said driving assembly, said adjustment assembly being for adjusting a distance through which said actuation plates are moved through by said driving assembly when said adjustment assembly is actuated by the user; and said dividing assembly comprising a horizontal shutter, said horizontal shutter being operationally coupled to said driving assembly, said horizontal shutter selectively closing a bottom opening of said receiving space of said housing of said separation assembly when said horizontal shutter is being biased towards said housing of said separation assembly, said horizontal shutter being actuated by said driving assembly for withdrawing said horizontal shutter from said housing for releasing dough extruded into said receiving space through said open bottom of said receiving space for processing by the user.

* * * * *